(12) United States Patent
Kelly et al.

(10) Patent No.: US 6,694,222 B1
(45) Date of Patent: Feb. 17, 2004

(54) FUZZY LOGIC CONTROL OF A VARIABLE DISPLACEMENT COMPRESSOR IN A VEHICLE AIR CONDITIONING SYSTEM

(75) Inventors: Sean Michael Kelly, Churchville, NY (US); John M. Kirchberger, Gasport, NY (US); Ernesto Jose Gutierrez, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/206,621

(22) Filed: Jul. 26, 2002

(51) Int. Cl.⁷ .............................................. G05B 15/00
(52) U.S. Cl. ...................... 700/276; 700/281; 700/282; 62/208
(58) Field of Search ................................ 700/276, 281, 700/282; 62/208

(56) References Cited

U.S. PATENT DOCUMENTS

| | | | |
|---|---|---|---|
| 4,914,924 A | 4/1990 | Takahashi | 62/133 |
| 5,259,210 A * | 11/1993 | Ohya et al. | 62/212 |
| 5,344,070 A | 9/1994 | Akasaka et al. | 236/49.3 |
| 5,419,146 A * | 5/1995 | Sibik et al. | 62/115 |
| 5,442,926 A * | 8/1995 | Kawai et al. | 62/211 |
| 5,546,756 A * | 8/1996 | Ali | 62/204 |
| 5,553,776 A | 9/1996 | Davis, Jr. et al. | 236/49.3 |
| 5,632,154 A * | 5/1997 | Sibik et al. | 62/99 |
| 5,809,795 A * | 9/1998 | Beaverson et al. | 62/218 |
| 5,921,099 A | 7/1999 | Lee | 62/228.4 |
| 5,937,941 A | 8/1999 | Gach | 165/204 |
| 6,047,557 A | 4/2000 | Pham et al. | 62/228.5 |
| 6,092,380 A | 7/2000 | Kachur et al. | 62/228.3 |
| 6,247,900 B1 | 6/2001 | Archibald et al. | 417/222.1 |
| 6,519,508 B1 * | 2/2003 | Saito | 700/282 |
| 6,539,267 B1 * | 3/2003 | Eryurek et al. | 700/51 |
| 2003/0094004 A1 * | 5/2003 | Pham et al. | 62/126 |

* cited by examiner

Primary Examiner—Leo Picard
Assistant Examiner—Alexander Kosowski
(74) Attorney, Agent, or Firm—Patrick M. Griffin

(57) ABSTRACT

A non-linear control method for an air conditioning system utilizes fuzzy logic to regulate the activation of a displacement control valve for a variable displacement compressor for maintaining a system parameter, such as the evaporator outlet pressure or temperature, at a desired value. The control inputs include the system parameter to be controlled and a refrigerant pressure that reflects changes in the compressor displacement.

4 Claims, 3 Drawing Sheets

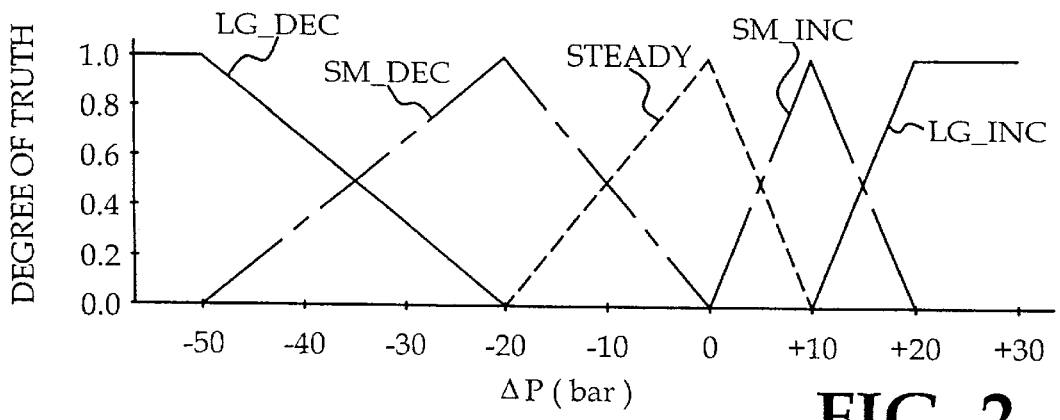
FIG. 2
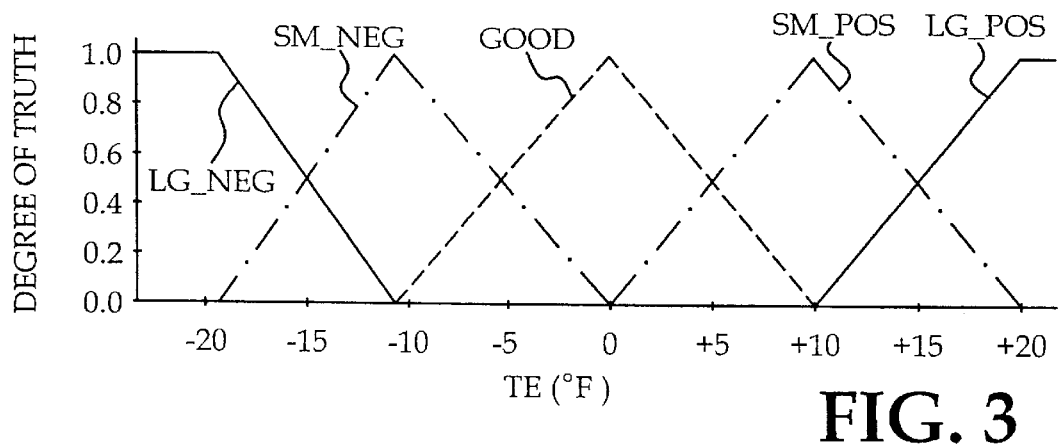
FIG. 3
|  | LG_NEG (0) | SM_NEG (0) | GOOD (0) | SM_POS (0.6) | LG_POS (0.4) |
|---|---|---|---|---|---|
| LG_DEC (0.4) | LD (0) | SD (0) | SD (0) | SD (0.24) | SI (0.16) |
| SM_DEC (0.6) | LD (0) | SD (0) | SD (0) | SD (0.36) | SI (0.24) |
| STEADY (0) | SD (0) | SD (0) | NC (0) | SI (0) | LI (0) |
| SM_INC (0) | SD (0) | NC (0) | SI (0) | SI (0) | LI (0) |
| LG_INC (0) | SD (0) | SI (0) | LI (0) | LI (0) | LI (0) |
FIG. 4

FUZZY LOGIC CONTROL OF A VARIABLE DISPLACEMENT COMPRESSOR IN A VEHICLE AIR CONDITIONING SYSTEM

TECHNICAL FIELD

This invention relates to a vehicle air conditioning system including a variable displacement refrigerant compressor, and more particularly to a method of controlling an electrically activated compressor displacement control valve.

BACKGROUND OF THE INVENTION

Variable displacement refrigerant compressor have been utilized in automotive air conditioning systems to reduce accessory load fluctuations associated with on/off cycling of a fixed displacement compressor. In a typical arrangement, a variable displacement compressor includes one or more pistons coupled to a wobble plate, and the tilt angle of the wobble plate is adjustable to vary the stroke of the pistons, and hence the displacement or pumping capacity of the compressor. Adjustment of the wobble plate angle is achieved by changing a differential pressure acting on a wobble plate control mechanism, and the differential pressure is controlled by a displacement control valve that varies the pressure in a crankcase of the compressor. While the control valve may be implemented pneumatically, an electrically activated configuration (such as a pulse-width-modulated or linear control valve) lends itself to the implementation of electronic control algorithms. For example, a microprocessor-based controller can activate an electrical control valve to regulate compressor displacement as required to maintain the evaporator outlet air temperature at a desired value, taking into account other system parameters such as high-side or low-side refrigerant pressure. See, for example, the U.S. Pat. No. 6,092,380 to Kachur et al., issued on Jul. 25, 2000, and assigned to the assignee of the present invention. However, nonlinearities and delays in the control response of the compressor and the air conditioning system in general sometimes make it difficult to achieve a stable and reliable control without adding undue complexity to the control algorithm. Accordingly, what is needed is an easily implemented control algorithm that accommodates the non-linear characteristics of the compressor and air conditioning system for regulating compressor displacement to achieve a stable and reliable system control.

SUMMARY OF THE INVENTION

The present invention is directed to a non-linear fuzzy logic control method for an air conditioning system including an electronic controller and a variable displacement compressor, wherein the controller carries out the control method to electrically activate a compressor displacement control valve for regulating the compressor displacement as required to maintain a system parameter, such as the evaporator outlet pressure or temperature, at a desired value. The control inputs include the system parameter to be controlled and a refrigerant pressure that reflects changes in the compressor displacement. The output of the fuzzy logic control is a requested change in control valve activation, and the activation of the control valve is updated based on the requested change.

BRIEF DESCRIPTION OF THE DRAWINGS

FIG. 2 is a diagram depicting a fuzzy logic input membership function for a measured change in refrigerant pressure in the system of FIG. 1.

FIG. 3 is a diagram depicting a fuzzy logic input membership function for a measured evaporator temperature error in the system of FIG. 1.

FIG. 4 is a matrix depicting a fuzzy logic rule base for processing the input membership functions of FIGS. 2 and 3 to determine corresponding control response weighting factors.

FIG. 6 depicts a main flow diagram, while FIG. 7 depicts a flow diagram detailing a portion of the flow diagram of FIG. 6 pertaining to the generation of a fuzzy logic inference.

DESCRIPTION OF THE PREFERRED EMBODIMENT

Figure 1:
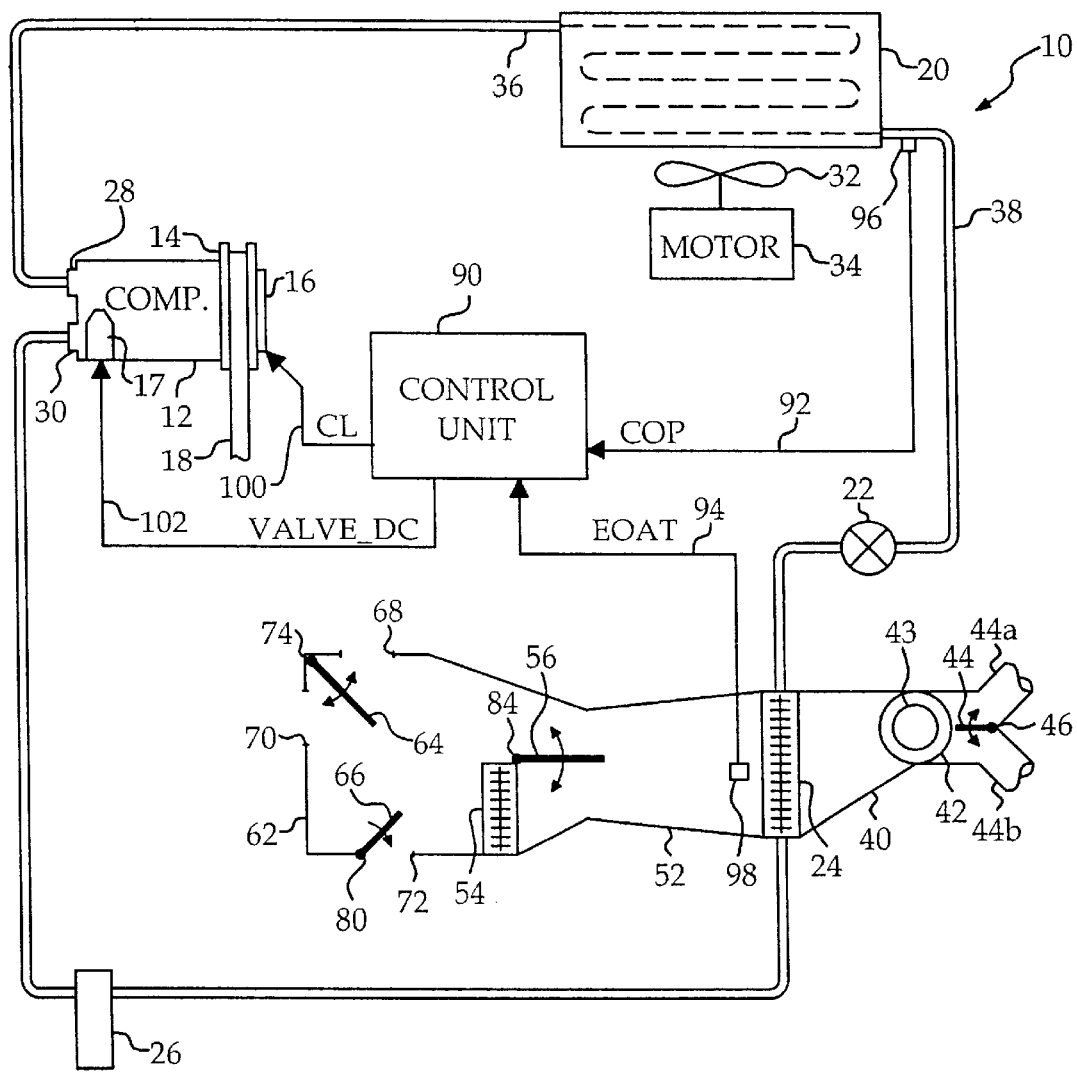
FIG. 1 is a block diagram of a vehicle air conditioning system according to this invention, including a variable capacity refrigerant compressor and a microprocessor-based control unit.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a variable displacement for adjusting its capacity, and includes a displacement control valve 17 that is electrically activated to effect capacity control. In particular, the pumping capacity of compressor 12 is determined by the pressure in its crankcase relative to the pressure at its suction port, and the control valve 17 is pulse-width-modulated (PWM) at a variable duty cycle to control the crankcase pressure by alternately coupling the crankcase to the compressor suction and discharge ports 30, 28. In the illustrated embodiment, increasing the PWM duty cycle (i.e., the on/off time ratio of control valve 17) increases the crankcase pressure to decrease the compressor displacement, whereas decreasing the PWM duty cycle decreases the crankcase pressure to increase the compressor displacement. See, for example, the U.S. Pat. No. 6,247,900 to Archibald et al., issued on Jun. 19, 2001, assigned to the assignee of the present invention, and incorporated herein by reference. Of course, other compressor configurations and control valve configurations (such as a linear control valve) are also possible, as will be recognized by those skilled in the art.

The drive pulley 14 is coupled to a rotary shaft of the vehicle engine (not shown) via drive belt 18, and the clutch 16 is selectively engaged or disengaged to turn the compressor 12 on or off, respectively. The system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 pivoted at point 46 is adjustable as shown to control inlet air mixing; depending on the door position, outside air may enter blower 42 through duct leg 44*a*, and passenger compartment air may enter blower 42 through duct leg 44*b*. An air outlet duct 52 disposed on the downstream side of blower 42 and evaporator 24 houses a heater core 54 formed as an array of finned tubes that conduct engine coolant. The outlet duct 52 is bifurcated with the heater core 54 disposed in one air stream of duct 52. A temperature control door 56 pivoted at a point 84 is adjustable as shown to control what proportion of air must pass through the heater core 54. The heated and un-heated air portions are mixed in a plenum portion 62 of outlet duct 52 downstream of temperature control door 56, and a pair of mode control doors 64, 66 direct the mixed air through one or more outlets, including a defrost outlet 68, a panel outlet 70, and a heater outlet 72. The mode control doors 64 and 66, pivoted at points 74 and 80, respectively, are adjustable as shown to switch the outlet air between various combinations of defrost outlet 68, panel outlets 70 and heater outlet 72.

The system 10 is controlled by the microprocessor-based control unit 90 based on various inputs. In the illustrated embodiment, such inputs include the condenser outlet refrigerant pressure (COP) on line 92 and the evaporator outlet air temperature (EOAT) on line 94. The COP input is developed by a suitable pressure sensor 96, and the EOAT input is developed by a suitable temperature sensor 98. In response to these and other inputs, the control unit 90 develops output signals for controlling the compressor clutch 16 and the capacity control valve 17. The output signal CL for the clutch 16 appears on line 100, while the output signal VALVE_DC for the control valve 17 appears on line 102. In general, the control unit 90 activates the clutch 16 whenever air conditioning or defog/defrost operation is requested, and adjusts the control valve duty cycle to maintain EOAT at or near a target value. Although not illustrated in FIG. 1, the control unit 90 may also regulate the operation of condenser blower motor 34, inlet air blower motor 43, inlet air control door 44, and air control doors 56, 64, 66, depending on whether the system 10 is configured to provide manual or automatic climate control.

Figure 5:
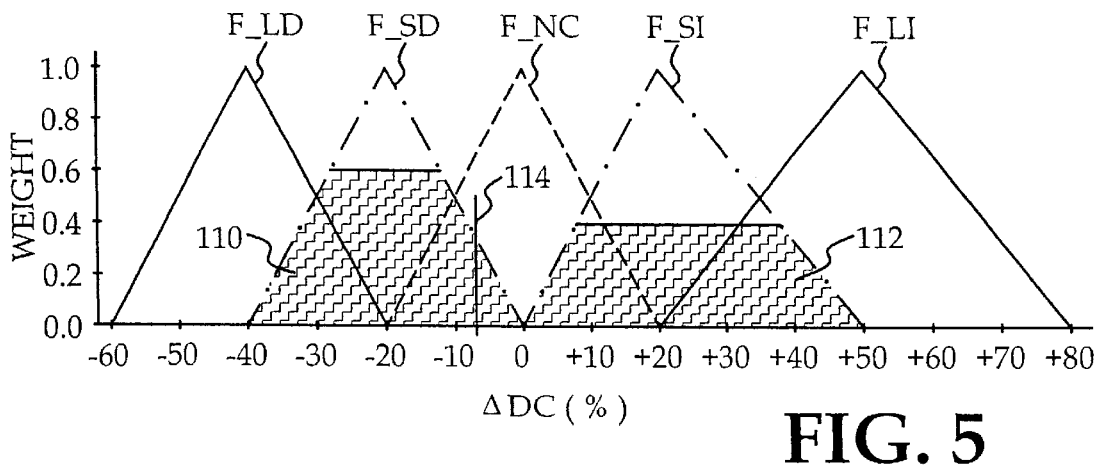
FIG. 5 is a diagram depicting a fuzzy logic output membership function for converting the control response weighting factors of FIG. 4 into a capacity control signal for the refrigerant compressor of FIG. 1.

According to this invention, the control unit 90 carries out a non-linear fuzzy logic control method for regulating the capacity of compressor 12 as required to maintain EOAT at a desired value. As mentioned above, the control inputs include EOAT and COP, although the input COP could be replaced by a different refrigerant pressure that reflects changes in the compressor displacement, such as the compressor outlet pressure, the compressor suction pressure, and so on. In general, the fuzzy logic method involves three steps. The first step, depicted by the diagrams of FIGS. 2 and 3, is the evaluation of a set of input membership functions for a determined change $\Delta P$ in COP, and the error TE between EOAT and the desired outlet temperature value EOATdes. For purposes of description, TE is defined as the difference (EOATdes−EOAT). The second step; depicted by the matrix of FIG. 4, is the application of fuzzy logic rules and reasoning to the evaluated input membership functions to characterize the required adjustment of the control valve duty cycle VALVE_DC. And the third step, depicted by the diagram of FIG. 5, is the evaluation of an output membership function for determining a duty cycle adjustment $\Delta DC$.

Referring to FIG. 2, the input membership function for the measured change $\Delta P$ in condenser outlet pressure COP has five possible characterizations as represented by the traces labeled LG_DEC (indicating a large decrease in COP), SM_DEC (indicating a small decrease in COP), STEADY (indicating little or no change in COP), SM_INC (indicating a small increase in COP), and LG_INC (indicating a large increase in COP). The determined pressure change $\Delta P$ is applied to the various characterizations, and the vertical scale represents the degree of truthfulness for each characterization. For example, if a pressure decrease of 32 bar occurs, LG_DEC has a value of 0.4, SM_DEC has a value of 0.6, and STEADY, SM_INC and LG_INC have zero values. In the illustrated embodiment, it will be seen that for any value of $\Delta P$, only one or two of the possible characterizations have a non-zero value.

Referring to FIG. 3, the input membership function for the measured evaporator outlet air temperature error TE has five possible characterizations as represented by the traces labeled LG_NEG (indicating a large negative temperature error), SM_NEG (indicating a small negative temperature error), GOOD (indicating little or no temperature error), SM_POS (indicating a small positive temperature error), and LG_POS (indicating a large positive temperature error). The determined temperature error TE is applied to the various characterizations, and the vertical scale represents the degree of truthfulness for each characterization. For example, if a positive temperature error of 13.5 degrees F. occurs, LG_POS has a value of 0.4, SM_POS has a value of 0.6, and GOOD, SM_NEG and LG_NEG have zero values. As with the $\Delta P$ membership functions depicted in FIG. 2, it will be seen that for any value of TE, only one or two of the possible temperature error characterizations have a non-zero value.

Referring to FIG. 4, the depicted matrix illustrates a set of fuzzy logic rules that utilize the input membership function values to characterize the required control valve response. The matrix values represent calibrated duty cycle adjustments: LD represents a large decrease in duty cycle, SD represents a small decrease in duty cycle, SI represents a small increase in duty cycle, LI represents a large increase in duty cycle, and NC signifies no change in duty cycle. Although the rules are processed numerically as illustrated below, they may be represented linguistically as well. For example, the upper left corner matrix cell represents the rule that a large decrease (LD) in the control valve duty cycle is needed if there is a large negative temperature error (i.e., LG_NEG is non-zero) and there has been a large decrease in COP (i.e., LG_DEC is non-zero). The degree to which both conditions are present is determined by computing the product of LG_DEC and LG_NEG), and the product is used as a weight or factor in determining the appropriate response. A minimum function may also be used. For purpose of illustration, the exemplary membership function values given above in respect to FIGS. 2 and 3, and the corresponding matrix cell weights are shown parenthetically in FIG. 4. In such case, non-zero weights occur in four matrix cells involving the adjustments SD and SI; the adjustment SD has a combined weight of 0.60 (0.24+0.36), and the adjustment SI has a combined weight of 0.40 (0.16+0.24).

Referring to FIG. 5, the process of consolidation or de-fuzzification of the logic rule outcomes (weights)

involves utilizing a "center-of-area" technique, or alternatively a "center-of-evidence" technique. Essentially, the rule-based weights are applied to output functions that correspond to the respective calibrated duty cycle adjustments. In the illustrated embodiment, the output functions are designated by the traces F_LD, F_SD, F_NC, F_SI, F_LI, and correspond to the duty cycle adjustments LD, SD, NC, SI, LI. In the above described example where the adjustment SD has a weight of 0.60, and the adjustment SI has a weight of 0.40, the functions F_SD and F_SI define the areas designated in FIG. 5 by the reference numerals 110 and 112, respectively. The horizontal (or x-axis) center of the combined areas 110 and 112 is then determined, as indicated by the line 114, and the control valve duty cycle adjustment is determined in accordance with the corresponding ΔDC value of −7%, as indicated.

Figure 6:
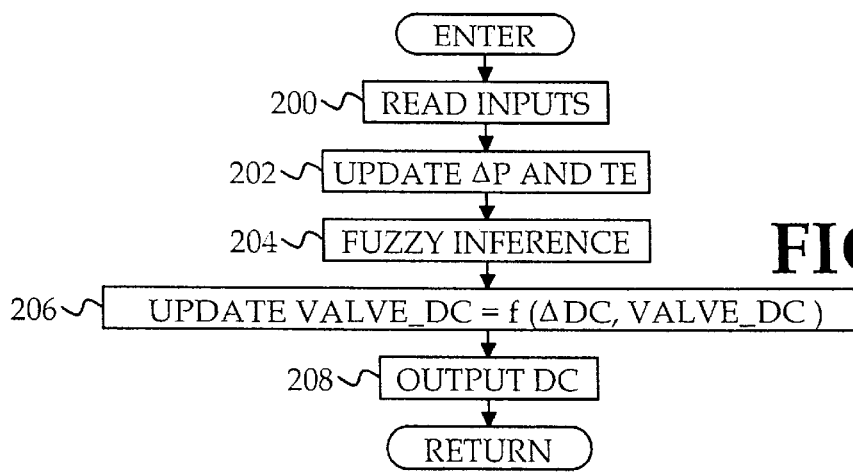
FIGS. 6 and 7 together form a flow diagram representative of a software routine executed by the control unit of FIG. 1 according to this invention.
Figure 7:
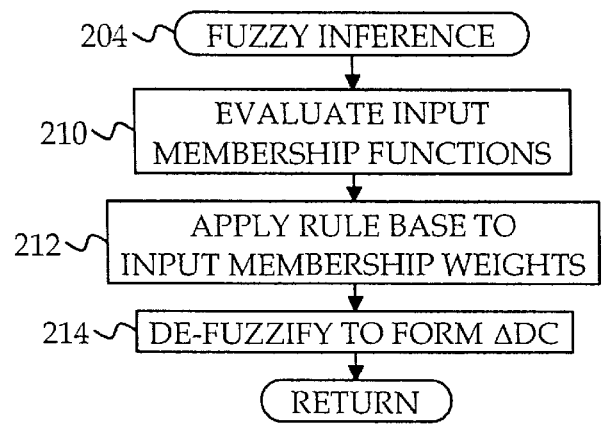

FIGS. 6 and 7 form a flow diagram representative of a software routine executed by the control unit 90 in carrying out the above-described control. The main flow diagram, depicted in FIG. 6, involves the steps of reading the inputs COP and EOAT, updating the fuzzy logic inputs ΔP and TE (blocks 200 and 202), determining a fuzzy logic inference regarding the control valve duty cycle based on ΔP and TE (block 204), updating the control valve output signal VALVE_DC based on the fuzzy inference (block 206), and outputting VALVE_DC (block 208). The inputs ΔP and TE and the output VALVE_DC are preferably updated using a digital or analog filter for reduced noise sensitivity, and to smooth changes in the output signal VALVE_DC. The step of determining a fuzzy logic inference is detailed in the flow diagram of FIG. 7, and involves three steps as described above in reference to FIGS. 2–5. As indicated, the control unit 90 first evaluates the input membership functions that characterize the input values ΔP and TE (block 210), then applies the fuzzy rules to the input membership values to determine the control response weights (block 212), and then de-fuzzifies the determined weights to determine the control valve duty cycle adjustment (block 214).

In summary, the control of the present invention enables the creation of a nonlinear control that is relatively easy to implement and calibrate, and that may be customized for different plant characteristics and operating regions Calibration is achieved by adjusting the input and output membership functions, the rule-base entries (desired actions or responses), and the input and output filter gains. While the invention has been described in reference to the illustrated embodiment, it is expected that various modifications in addition to those mentioned above will occur to those skilled in the art. For example, the illustrated input and output membership functions are merely illustrative in nature, and so on. Thus, it will be understood that control methods incorporating these and other modifications may fall within the scope of this invention, which is defined by the appended claims.

What is claimed is:

1. A method of controlling an electrically activated displacement control valve of a variable displacement refrigerant compressor in an air conditioning system for regulating a system parameter to a desired value, the method comprising the steps of:

measuring the regulated system parameter, and determining an error of the measured parameter with respect to the desired value;

measuring a pressure of refrigerant in the system, and detecting a rate of change of such measured pressure;

determining an activation adjustment for the control valve by applying fuzzy logic membership functions and predetermined fuzzy logic rules to the determined error and the detected rate of change in the measured pressure; and adjusting an activation of said control valve based on the determined activation adjustment.

2. The method of claim 1, wherein the step of determining an activation adjustment for the control valve includes the steps of:

evaluating fuzzy logic input membership functions for the determined error and the detected rate of change in pressure for characterizing magnitudes of the determined error and the detected rate of change in the measured pressure;

applying fuzzy logic rules to the evaluated input membership functions to formulate one or more possible adjustments for said valve activation; and evaluating one or more fuzzy logic output membership functions for the one or more possible adjustments to determine the activation adjustment for the control valve.

3. The method of claim 1, wherein the system includes an evaporator, and the regulated system parameter is an air temperature at an outlet of the evaporator.

4. The method of claim 1, wherein the system includes a condenser, and said refrigerant pressure is measured at an outlet of the condenser.

* * * * *